United States Patent
Boelitz et al.

(10) Patent No.: US 12,313,025 B2
(45) Date of Patent: May 27, 2025

(54) ROCKET TANK LIQUID LEVEL DETERMINATION, AND ASSOCIATED SYSTEMS AND METHODS

(71) Applicant: Blue Origin Manufacturing, LLC, Huntsville, AL (US)

(72) Inventors: Frederick W. Boelitz, Sammamish, WA (US); Richard D. Jones, Kent, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 602 days.

(21) Appl. No.: 16/351,405

(22) Filed: Mar. 12, 2019

(65) Prior Publication Data

US 2019/0277224 A1    Sep. 12, 2019

Related U.S. Application Data

(60) Provisional application No. 62/641,754, filed on Mar. 12, 2018.

(51) Int. Cl.
*F02K 9/96* (2006.01)
*F02K 9/60* (2006.01)
(Continued)

(52) U.S. Cl.
CPC ............ *F02K 9/96* (2013.01); *F02K 9/60* (2013.01); *F02K 9/605* (2013.01);
(Continued)

(58) Field of Classification Search
CPC .... G01C 9/06; G01C 9/20; F02K 9/96; G01F 23/2928; G01F 23/00; G01F 23/0007;
(Continued)

(56) References Cited

U.S. PATENT DOCUMENTS

| 4,913,379 A | * | 4/1990 | Kubota | ................... F42B 10/60 239/265.35 |
| 4,984,457 A | | 1/1991 | Morris | |

(Continued)

FOREIGN PATENT DOCUMENTS

| GB | 2166103 | 4/1986 |
| RU | 2431808 | 10/2011 |
| RU | 2541576 | 2/2015 |

OTHER PUBLICATIONS

International Search Report and Written Opinion for International Patent Application No. PCT/US2019/021933, Applicant: Blue Origin, LLC., mailed Jun. 13, 2019, 8 pages.

*Primary Examiner* — Thomas P Burke
(74) *Attorney, Agent, or Firm* — Hogan Lovells US LLP

(57) ABSTRACT

Rocket tank liquid level determination, and associated systems and methods. A representative system includes a computer-readable medium having instructions that, when executed, receive an image corresponding to a view of the liquid in the rocket tank, identify an edge between the liquid and a wall of the tank, and, based on at least one of a size, shape, location, or orientation of the edge, estimate a level of the liquid in the tank. In addition to or in lieu of determining the liquid level, the system can determine a characteristic of a sloshing motion of the liquid in the tank, and, based at least on the characteristic of the sloshing motion, direct operation of a forcing element that imparts a force to the rocket to at least partially counteract a force placed on the rocket by the sloshing motion of the liquid in the tank.

28 Claims, 4 Drawing Sheets

(51) Int. Cl.
*G01F 23/00* (2022.01)
*G01F 23/80* (2022.01)
*B64G 1/40* (2006.01)
*G01F 22/00* (2006.01)

(52) U.S. Cl.
CPC ........ *G01F 23/0007* (2013.01); *G01F 23/802* (2022.01); *B64G 1/402* (2013.01); *F05D 2270/8041* (2013.01); *F17C 2260/016* (2013.01); *G01F 22/00* (2013.01)

(58) Field of Classification Search
CPC .. G01F 23/0061; G01F 23/0069; G01F 22/00; F17C 2260/016; F17C 2250/038; F17C 2250/0408; F17C 2250/061; B64G 1/401; B64G 1/402; F05D 2270/804; F05D 2270/8041
USPC ............... 73/290 R; 382/162, 164, 181, 199; 702/55
See application file for complete search history.

(56) References Cited

U.S. PATENT DOCUMENTS

| | | | | |
|---|---|---|---|---|
| 6,098,029 | A * | 8/2000 | Takagi | G06T 7/60 382/100 |
| 6,782,122 | B1 * | 8/2004 | Kline | G01F 23/292 250/223 B |
| 8,019,494 | B1 * | 9/2011 | Mango | F02K 9/48 701/13 |
| 8,604,402 | B2 | 12/2013 | Prampolini | |
| 2009/0076669 | A1 * | 3/2009 | Krishnaswamy | F02K 9/84 701/4 |
| 2010/0322462 | A1 * | 12/2010 | Wu | G06K 9/00 382/100 |
| 2015/0130930 | A1 * | 5/2015 | Turner | G01F 23/0069 348/135 |
| 2016/0341591 | A1 * | 11/2016 | Cipullo | G01F 23/292 |
| 2017/0230635 | A1 * | 8/2017 | Zakrzewski | G06T 7/62 |

* cited by examiner

ROCKET TANK LIQUID LEVEL DETERMINATION, AND ASSOCIATED SYSTEMS AND METHODS

CROSS-REFERENCE TO RELATED APPLICATION

The present application claims priority to U.S. Provisional Application No. 62/641,754, filed on Mar. 12, 2018 and incorporated herein by reference.

TECHNICAL FIELD

The present technology is directed to rocket tank liquid level determination, and associated systems and methods, including techniques for actively countering liquid sloshing.

BACKGROUND

Rockets are routinely used to launch payloads into space. Many rockets include liquid fuels and liquid oxidizers, which are stored in corresponding tanks. In order to maximize the payload delivered by the rocket to orbit or elsewhere, operators maintain the maximum levels of fuel and oxidizer within the tanks just prior to liftoff. Conventionally, rockets have included multiple, discrete, wet-level sensors located along the longitudinal axis of the tank to measure the propellant level. However, due to cost, installation, accuracy, reliability, and electrical complexity concerns, such techniques suffer from multiple drawbacks. In addition, the fuel and/or oxidizer within the tanks tends to slosh back and forth during flight. The forces created by the sloshing motion can affect the trajectory of the rocket. One approach to addressing sloshing is to place baffles within the liquid tanks. However, baffles add weight to the rocket, which in turn reduces the payload the rocket can carry. Accordingly, there remains a need for improved liquid detection and control techniques for rockets and other tanks.

DETAILED DESCRIPTION

Figure 1:
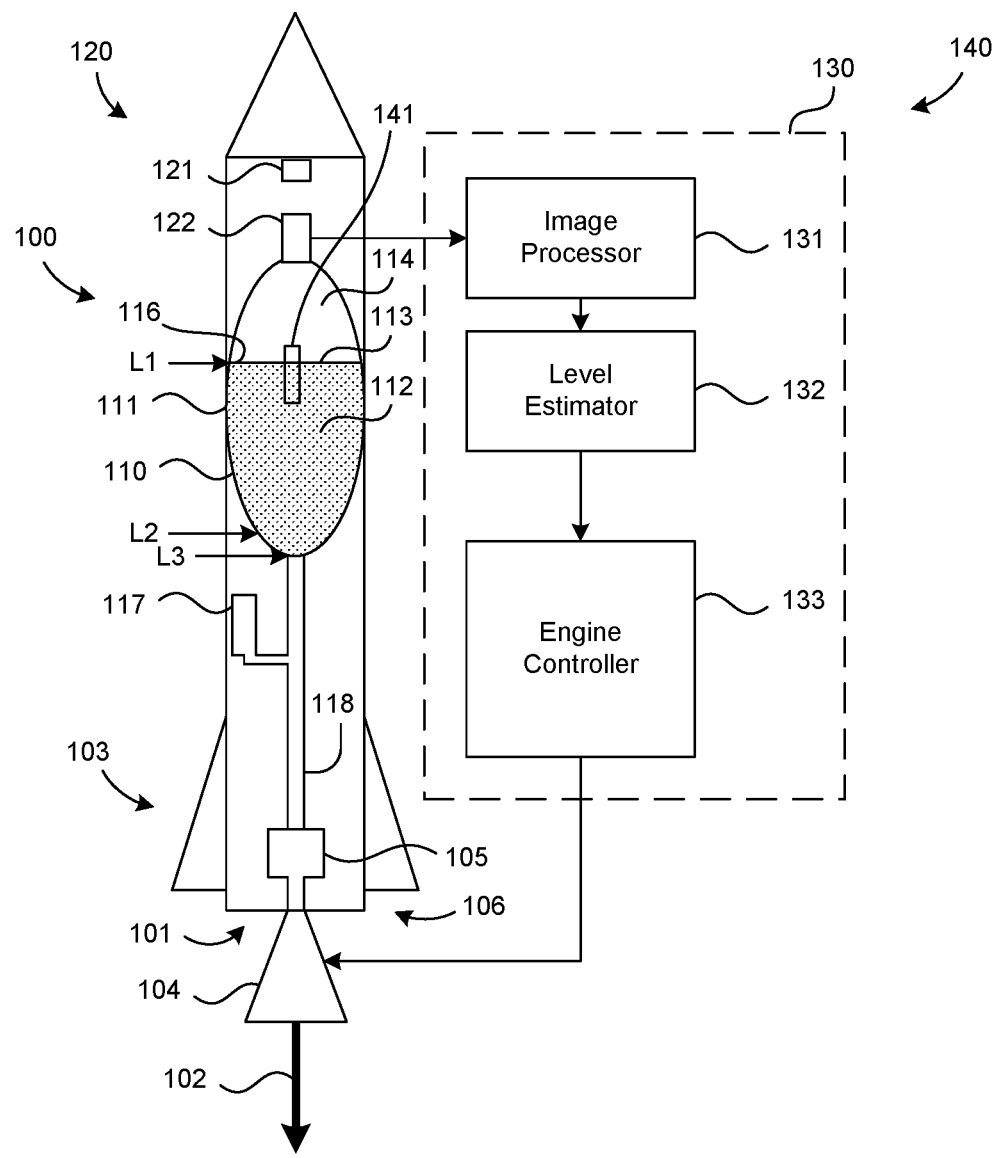
FIG. 1 is a partially schematic illustration of a rocket that includes a liquid detection system configured in accordance with embodiments of the present technology.

Several embodiments of the present technology are directed to systems and methods for determining the liquid level in a rocket propellant tank, and/or for detecting characteristics of the liquid (e.g., the sloshing behavior of the liquid), and controlling the rocket to alleviate such characteristics. For example, the present technology can include using a camera or other image sensor to determine the depth of the liquid in the tank to a high degree of precision. This approach can be more accurate and/or more reliable than existing techniques. The image sensor can, in addition to or in lieu of determining the amount of fluid in the tank, determine the sloshing behavior of the fluid in the tank. With this information, the rocket control system can adjust for the sloshing behavior to maintain the rocket's trajectory. For example, the control system can adjust the position of aerodynamic surfaces and/or the orientation of a thrust vectoring system to counteract the tendency for the liquid in the propellant tank to slosh. This approach can reduce the size of the baffles included in the propellant tank, or eliminate the need for such baffles entirely. As a result, the weight of the rocket can be reduced, which can in turn increase the payload capacity of the rocket.

Specific details of several embodiments of the disclosed technology are described below with reference to particular, representative configurations. The disclosed technology may be practiced in accordance with rockets, tanks, fluid pressure vessels, fluid containing vessels, and/or control systems having other suitable configurations. Specific details describing structures or processes that are well-known and often associated with rockets, propellant tanks, and/or other suitable tanks, but that may unnecessarily obscure some significant aspects of the presently disclosed technology, are not set forth in the following description for purposes of clarity. Moreover, although the following disclosure sets forth some embodiments of different aspects of the disclosed technology, some embodiments of the technology can have configurations and/or components different than those described in this section. As such, the present technology may include some embodiments with additional elements and/or without several of the elements described below with reference to FIGS. 1-5B.

Several embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

As used herein the term "image" refers generally to a digital representation of an object that provides an input to one or more processes disclosed herein. The image may or may not be presented at an image display (e.g., a computer screen). In some embodiments, the digital representation is based on reflections of electromagnetic radiation (e.g., light, radar and/or another electromagnetic radiation), or other waves (e.g., sound waves). More generally, the characteristics of the liquid are determined via techniques that do not require direct contact between the detector and the liquid. Accordingly, while representative techniques are described below in the context of an image sensor, the technology is more generally directed to non-contact detection devices and methods for detecting liquid characteristics, and taking actions based on the detected characteristics.

FIG. 1 is a partially schematic, side elevation view of a representative rocket 100 having aerodynamic surfaces 103 (e.g., fins) and a propulsion system 106. The propulsion system 106 includes a rocket engine 101 and one or more tanks 110, e.g., propellant tanks that include a liquid volume 112 used to power the rocket engine 101. As used herein, the term "propellant" can refer to a fuel and/or an oxidizer. The tank 110 is enclosed by a tank wall 111, and the liquid volume 112 has a liquid surface 113 at a boundary between the liquid volume 112 and the ullage 114 (e.g., the volume of the tank 110 that is unoccupied by the liquid). The liquid surface 113 has an edge 116 at the tank wall 111.

The rocket 100 can further include a liquid detection system 140 configured in accordance with embodiments of the present technology to detect characteristics of the liquid 112 in the tank 111. The detected characteristics can be used in a feedback loop to control (a) the level of propellant in the tank, and/or (b) the operation of the rocket 100, e.g., the rocket engine 101 and/or the aerodynamic surfaces 103, both of which apply forces to the rocket 100 during flight.

The rocket 100 can include multiple sensors (indicated generally by reference number 120), including an inertial measurement unit (IMU) 121 used to detect the position and orientation of the rocket 100, and an image sensor 122 used to monitor the condition of the liquid inside the tank 110. For example, the image sensor 122 can include a visible spectrum camera that identifies varying liquid levels within the tank 110 by capturing an image that includes the edge 116 between the liquid volume 112 and the tank wall 111. Three representative liquid levels are shown in FIG. 1 as a first level L1, a second level L2, and a third level L3, which are described in further detail below with reference to FIGS. 2A-2C. Information about the liquid levels in the tank 110 is transmitted from the image sensor 122 to a controller 130 that processes the information to identify and/or quantify the specific liquid levels, and/or take actions based on the identified liquid levels.

In some embodiments, the controller 130 includes an image processor 131, a level estimator 132, and an engine controller 133. The image processor 131 receives raw image data from the image sensor 122 and processes it, for example, to determine the location, orientation, shape, and/or other characteristics of the edge 116 between the liquid 112 and the tank wall 111. In a representative embodiment, the liquid in the tank includes liquid oxygen, which has a bright blue color. The tank wall 111 can have a contrasting color, for example, white. Accordingly, the image processor 131 can detect a boundary between pixels that display a predominately blue color and pixels that display a predominately white color to identify the edge 116 between the liquid 112 and the tank wall 111. For example, the image processor 131 can use an image color channel decomposition technique, as described further below with reference to FIG. 3.

The level estimator 132 can receive information from the image processor 131 (e.g., the location of the liquid edge 116) and, based on this information, identify the level of liquid in the tank 110. For example, the level estimator 132 can operate on the basis of the known dimensions and/or shape of the tank 110, the known position of the image sensor 122, and the known color characteristics of the liquid volume 112 and the tank wall 111 to identify the liquid level in the tank 110. This information can then be conveyed to the engine controller 133 and/or to other destinations, including other feedback devices, display monitors, databases, and/or indicators.

In one aspect of the present technology, the information provided by the level estimator 132 is used by operators and/or automated systems to adjust the level of the liquid in the tank prior to launch. For example, this information can be used to "top up" the tank just prior to launch. In other implementations, the information can be used to control the rocket propulsion system, as described further below.

As described above, a typical liquid-fueled rocket includes multiple propellant tanks, e.g., one for fuel and another for an oxidizer. In a configuration for which the rocket 100 is landed tail-first (e.g., for re-use), the rocket propulsion system 106 can further include one or more landing propellant tanks (e.g., one for fuel and one for an oxidizer) which contain propellant specifically reserved for landing. For purposes of illustration, the propulsion system 106 of the configuration shown in FIG. 1 is simplified to show a single main propellant tank 110 and a single landing propellant tank 117. The propellant can be a fuel or an oxidizer, and the corresponding oxidizer or fuel tank or tanks are not shown, for sake of clarity. During a typical launch operation, the main propellant tank 110 delivers propellant to a combustion chamber 105 of the rocket engine 101. In the combustion chamber 105, the separate propellant constituents (fuel and oxidizer) are combined, ignited, and directed to an engine nozzle 104, which produces thrust aligned along a thrust vector 102. At the end of the launch phase, the thrust provided by the engine 101 is cut off (e.g., at a main engine cut-off event or "MECO"). A reserve amount of propellant is contained in the landing propellant tank 117 to provide thrust for a tail-first landing.

The main propellant tank 110 and the landing propellant tank 117 both provide propellant to the engine 101 via a downcomer 118. If, during launch, the engine 101 is operated for too long a period of time, the main tank 110 will drain, and propellant will then be extracted from the landing propellant tank 117. As a result, the amount of propellant available to guide and land the rocket in a tail-first landing will be reduced. Conversely, if the engine 101 is cut off too soon, the amount of thrust delivered to the rocket 100 may be insufficient to achieve orbital velocity, or another suitable launch metric. Accordingly, in some embodiments, it is important to shut the engine 101 down when the main tank 110 is empty, but before the engine 101 begins drawing propellant from the landing tank 117, as described further below.

In a representative embodiment, the overall controller 130 automatically controls the engine 101 based on the amount of propellant in the main propellant tank 110. For example, the engine controller 133 can receive data from the level estimator 132 and use that data to shut the engine 101 down.

In particular, once the level estimator 132 indicates that the main tank 110 is empty, the engine controller 133 can shut the engine 101 down, thus preserving the propellant volume in the landing tank 117 for the subsequent landing operation. Further details of a representative sequence are described below with reference to FIGS. 2A-2C.

Figure 2A:
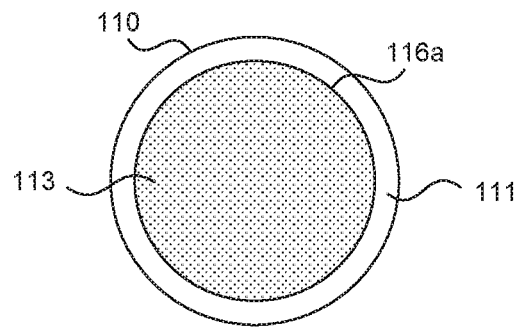
FIGS. 2A-2C are partially schematic illustrations of an interior of a rocket propellant tank having different quantities of liquid, as sensed by an image sensor in accordance with embodiments of the present technology.

FIG. 2A is a schematic representation of the view provided by the image sensor 122 (FIG. 1) when the liquid volume 112 is at the first level L1 (FIG. 1). In this view, the image sensor 122 detects a first liquid edge 116a between the liquid surface 113 and the tank wall 111.

Figure 2B:
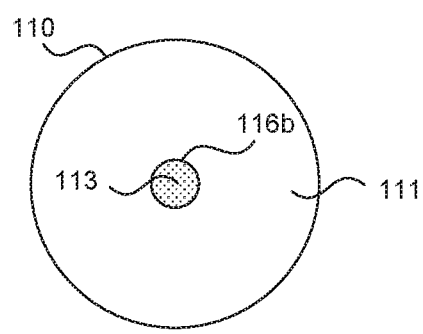

In FIG. 2B, the liquid surface 113 is at the second level L2 (FIG. 1), and forms a second liquid edge 116b with the tank wall 111. The liquid is now at a narrowing point of the tank 110, below the widest portion of the tank so that the tank wall 111 dominates the image. Accordingly, this image represents the liquid surface 113 nearing the bottom of the tank.

Figure 2C:
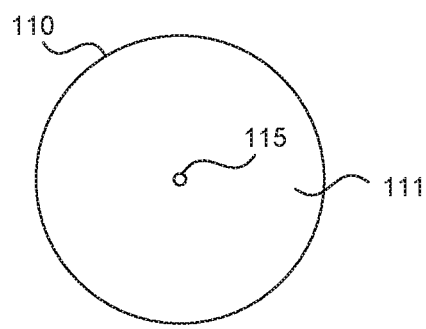

In FIG. 2C, the liquid has entirely emptied from the tank 110, and a tank exit 115 is now visible via the image sensor 122 (FIG. 1). The tank exit 115 corresponds to the entrance of the downcomer 118 shown in FIG. 1. When this state is detected, the engine controller 133 (FIG. 1) shuts the rocket engine 101 down, as described above with reference to FIG. 1.

Figure 3:
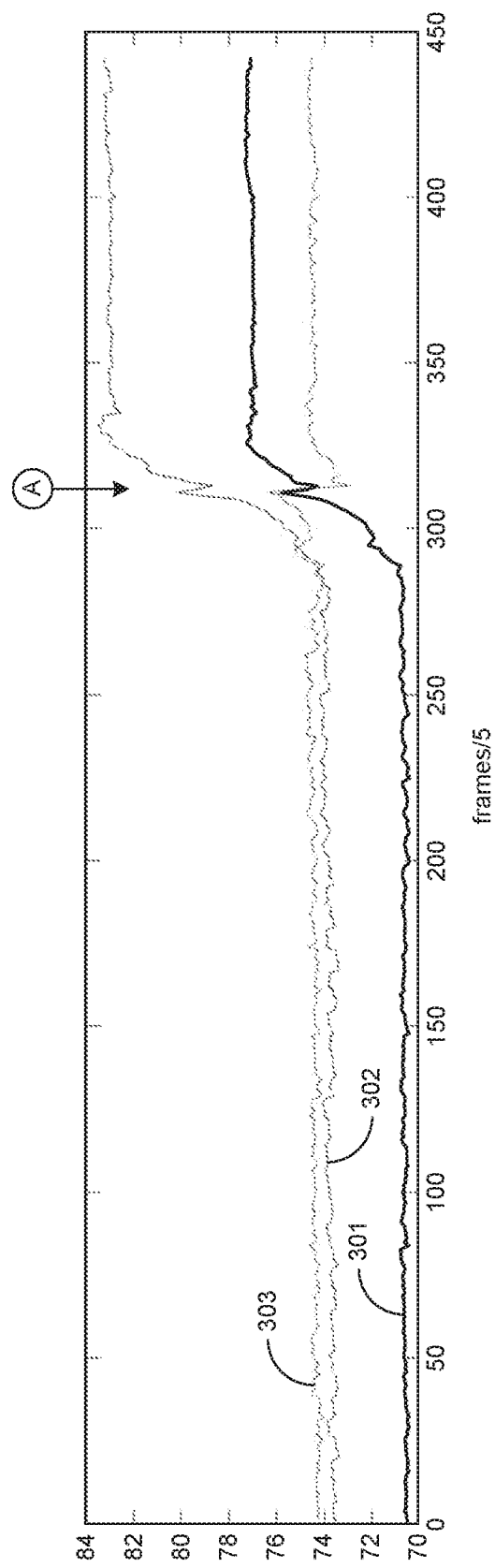
FIG. 3 is a graph illustrating color levels detected by pixels of an image sensor, as a function of time during a rocket operation, in accordance with embodiments of the present technology.

FIG. 3 is a graph illustrating the results detected by a representative image sensor 122 (FIG. 1), as a function of time (e.g., in the form of sequential image frame numbers for sequential images). In FIG. 3, the vertical scale is a subset of a range extending from 0 (e.g., white) to 128 (e.g., black). Line 301 represents the average across all pixels of the green light component of the pixels, line 302 represents the average across all pixels of the blue light component of the pixels, and line 303 represents the average across all pixels of the red light component of the pixels. As shown in FIG. 3, all three color components are relatively steady until approximately frame value 300. At that point, indicated by arrow A, the green and blue components (lines 301 and 302) become darker, indicating less blue-green color. The red pixel (line 303) returns to its original value after a transitional spike. Because the blue-green color corresponds to the color of liquid oxygen, the point in time indicated by arrow A corresponds to the last of the liquid oxygen departing the tank. Accordingly, FIG. 3 indicates a representative manner in which the imaging information obtained from the image sensor 122 can be used to identify the point in time at which the propellant tank empties. The frame speed of the image sensor 122 is rapid enough that the emptying event can be detected, processed, and responded to in a timely manner, e.g., before any propellant or any significant amount of propellant is withdrawn from the landing propellant tank 117. Depending on the installation, the processor can include an "offset" period, e.g., to allow the propellant remaining in the downcomer to be burned (and, in some cases, to allow some propellant in the landing tank 117 to be burned) before the engine is shut down.

Figure 4:
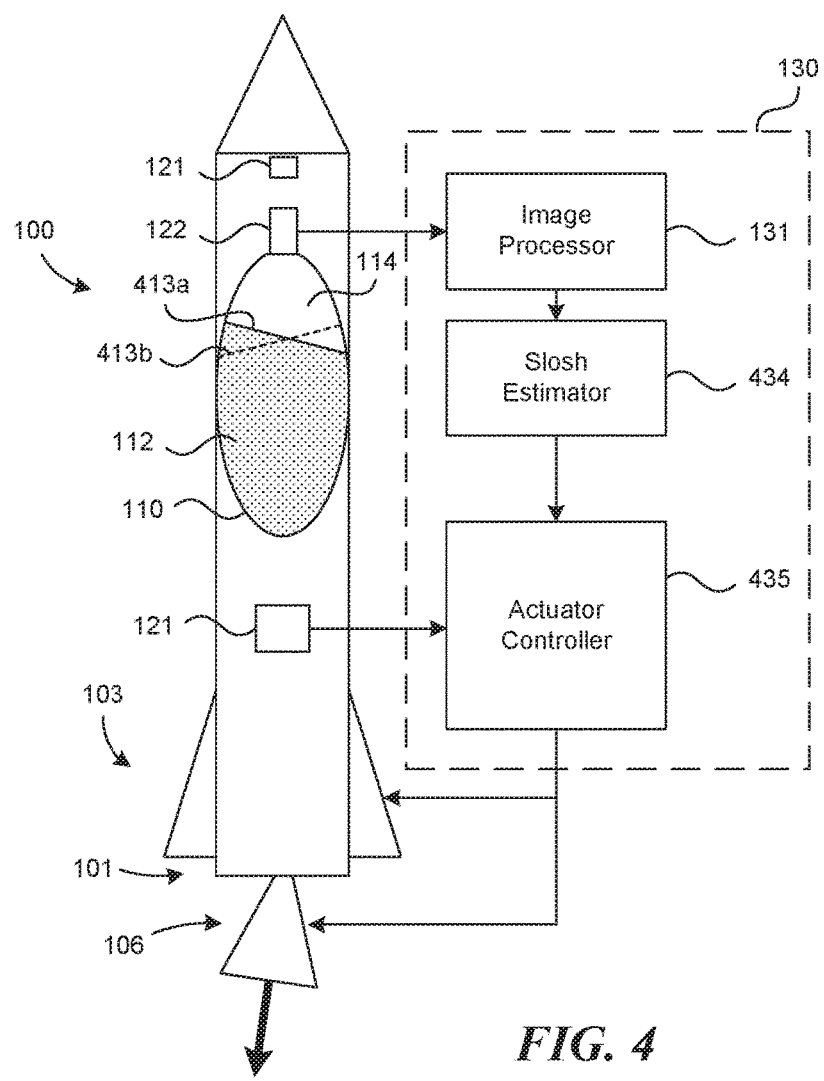
FIG. 4 is a partially schematic, isometric illustration of a rocket including a liquid detection system configured to identify and control liquid slosh in accordance with embodiments of the present technology.

FIG. 4 is a partially schematic illustration of the rocket 100 shown in FIG. 1, with the controller 130 configured to control the rocket based on an estimation of the slosh behavior of the propellant. The controller 130 can do so in addition to, or in lieu of, detecting the level of liquid in the tank 110, as described above with reference to FIGS. 1-3. The sloshing propellant in the tank 110 is illustrated schematically by a first liquid surface 413a and a second liquid surface 413b.

In some aspects of an arrangement shown in FIG. 4, the image processor 131 provides data to a slosh estimator 434.

The slosh estimator 434 uses the data provided by the image processor 131 to identify the slosh behavior of the propellant in the tank 110. For example, the slosh estimator 434 can use information corresponding to the time-varying liquid level within the tank 110 to estimate the amplitude and/or frequency of the waves of propellant in the tank 110. The slosh estimator 434 can use this information, in addition to the amount of propellant that is sloshing (i.e., the level of propellant in the tank), to identify the force that the sloshing fluid is imparting to the rocket 100. The controller 130 can also use this information to distinguish between external (aerodynamic) forces and internal (sloshing) forces, which allows the controller 130 to modulate the motion of the rocket in a manner that cancels out the internal forces.

The overall controller 130 can further include an actuator controller 435 that receives the information from the slosh estimator 434, combines this information with position data obtained from the IMU 121 (and/or other sensors), and, using pre-defined control laws, determines the commands for the rocket guidance system that reduce or eliminate the effects of slosh. The control laws can include a guidance and steering algorithm, an inner loop control law (for altitude control), a slosh effects compensator, and one or more command generators. The commands can be directed to the aerodynamic surfaces 103, the thrust vectoring engine 101, and/or other forcing elements, depending on factors that may include the altitude of the rocket 100. For example, the inputs can be directed to the aerodynamic surfaces 103 of the rocket 100 if the rocket is at a low enough altitude for the aerodynamic surfaces 103 to have sufficient control authority to produce the desired effect. The inputs can be directed to the engine 101, in addition to, or in lieu of, the aerodynamic surfaces 103, to change the direction of the thrust vector 102, again to mitigate or eliminate the potentially destabilizing force of the sloshing fuel on the rocket 100. The inputs to the guidance system will typically vary dynamically because (a) the sloshing effect is inherently dynamic, and (b) the sloshing effect changes as the propellant level changes.

Figures 5A, 5B:
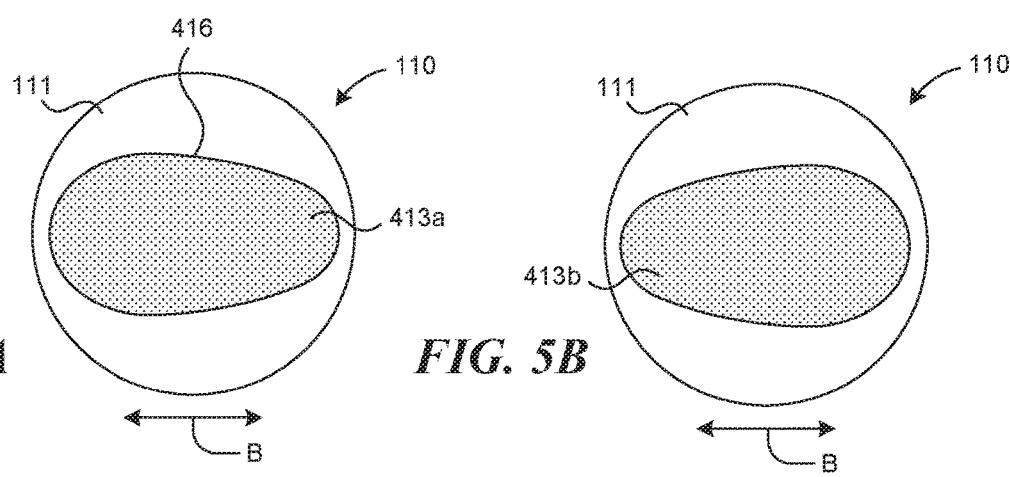
FIGS. 5A and 5B schematically illustrate the interior of a rocket propellant tank with a liquid surface having different shapes, depending upon slosh behavior, in accordance with embodiments of the present technology.

FIGS. 5A and 5B are schematic representations of the view obtained by the image sensor 122 (FIG. 4) as the propellant is sloshing (indicated by arrows B). In FIG. 5A, the first liquid surface 413a corresponds to the first liquid surface 413a shown in FIG. 4, with the liquid edge 416 having an asymmetric, elliptical shape corresponding to the sloped liquid surface, and the tapered walls 111 of the main tank 110. In FIG. 5B, the liquid propellant has sloshed in the opposite direction, as indicated by the second liquid surface 413b. By tracking the motion of the liquid surface as a function of time, e.g., identifying the size and shape of the liquid surface 413a, 413b, the controller 130 can estimate the force applied by the liquid to the rocket 100 and provide guidance system adjustments to counteract this force in the manner described above.

One feature of several of the embodiments described above is that the image sensor 122 can obtain real-time or near-real-time data corresponding to the level of propellant in the tank and/or the behavior of the propellant in the tank. This is unlike conventional systems, which typically use multiple, discrete, wet-level sensors located along the longitudinal axis of the tank to measure the propellant level. Such sensors are typically not as accurate, reliable, or simple as the image sensor 122 described above. Accordingly, an advantage of the arrangements described herein is that the level of fuel in the tank can be more accurately and dynamically determined. This in turn can increase the likelihood of providing a full tank of propellant before launch, and/or reduce the likelihood for shutting off the engine (a) prior to the main tank 110 completely emptying, and/or (b) after the propellant has begun exiting the landing tank 117.

In addition to or in lieu of the foregoing advantages, aspects of the present technology can include identifying the motion behavior of the propellant in the tank, and responding in a manner that reduces or eliminates the potentially destabilizing effects of such motion on the trajectory of the rocket 100. In particular, the image sensor 122 can track the time-varying characteristics of the propellant as it sloshes in the tank, and can direct the rocket guidance system to counteract the sloshing behavior, thereby reducing or eliminating its effect on the rocket trajectory. This approach can be more effective than a baffle 141 (see FIG. 1). Accordingly, this approach can allow the designer and manufacturer to reduce the size of any baffles in the tank, or eliminate such baffles entirely—in both cases, reducing manufacturing complexity and/or the weight of the rocket and potentially increasing the payload capacity of the rocket.

From the foregoing, it will be appreciated that some embodiments of the disclosed technology have been described herein for purposes of illustration, but that various modifications may be made without deviating from the technology. For example, in some applications, the level-sensing functions described above can be applied to fixed tanks, rather than mobile rocket propellant tanks, and the associated liquids can be liquids other than propellants. The term "tank" is used herein to apply generally to any of a variety of fluid containing vessels, including pressurized and/or non-pressurized vessels. The image sensor can operate in the visible spectrum and/or other spectra (e.g., infrared, ultraviolet, multispectral, and/or hyperspectral spectra). The sensor can sense electromagnetic radiation, or other types of energy, depending upon the application. For example, the sensor can sense ultrasonic waves. More generally, in any of these arrangements, the sensor typically senses a characteristic of the fluid that differs enough from the corresponding characteristic of the tank wall, that the boundary or edge between the fluid and the tank wall can be readily detected. For purposes of illustration, the sloshing behavior of the propellant is shown in FIGS. 4-5B as occurring along a single axis. In a typical operation, the propellant will slosh relative to multiple axes, which can be detected by the image sensor 122, and corrected for by the controller 130.

Suitable techniques for processing image data, that are applicable to both liquid level determination and slosh characteristics determination, include feature detection (e.g., edge and line detection) and extraction, and image dimensionality reduction. Representative algorithms include: clustering methods (e.g., connected-component labeling and k-means), detection and/or extraction methods (e.g., artificial neural networks, Canny edge detector, Hough transform, image segmentation and Sobel operator), and/or post-processing methods (e.g., conditional random fields and Gaussian mixture methods).

Suitable techniques for feedback control based on slosh characteristics detection include one or more of various multi-input/multi-output (MIMO) control techniques. Specific examples include: Linear Quadratic Gaussian (LQG) and LQG with Loop Transfer Recover (LQG/LTR) (and other variants such as Integral-LQ), H-infinity and Mu-synthesis, Eigen-Structure Assignment, and/or Quantitative Feedback Theory (QFT).

Certain aspects of the technology described in the context of particular embodiments may be combined or eliminated in other embodiments. For example, the controller can carry out both propellant level-sensing tasks and propellant slosh-sensing tasks. Further, while advantages associated with some embodiments of the disclosed technology have been described herein, configurations with different characteristics may also exhibit such advantages, and not all configurations need necessarily exhibit such advantages to fall within the scope of the technology. Accordingly, the disclosure and associated technology can encompass other arrangements not expressly shown or described herein.

To the extent any materials incorporated herein by reference conflict with the present disclosure, the present disclosure controls. As used herein, the phrase "and/or" as in "A and/or B" refers to A alone. B alone and both A and B.

The following examples provide further representative descriptions of the present technology.

EXAMPLES

1. A system for detecting a liquid level in a rocket tank, comprising:
　a computer-readable medium containing instructions that, when executed:
　　receive an image corresponding at least in part to a view of the liquid in the rocket tank;
　　identify an edge between the liquid and a wall of the rocket tank; and
　　based on at least one of a size, shape, location, or orientation of the edge, estimate a level of the liquid in the rocket tank.

2. The system of example 1 wherein the image is in the visible spectrum.

3. The system of any of the foregoing examples wherein the computer-readable medium contains instructions that, when executed, identify the edge based at least in part on a detected difference in color between the liquid and the wall of the rocket tank.

4. The system of any of the foregoing examples wherein the computer-readable medium contains instructions that, when executed, estimate a volume of the liquid in the rocket tank, based at least in part on the level of the liquid in the rocket tank.

5. The system of any of the foregoing examples wherein the liquid is a rocket propellant.

6. The system of any of the foregoing examples wherein the liquid includes rocket propellant, and wherein the computer-readable medium contains instructions that, when executed, change a thrust level of a rocket engine receiving the rocket propellant based at least in part on an input corresponding to the estimated level of the liquid in the rocket tank.

7. The system of example 6 wherein the instructions, when executed, shut down the rocket engine.

8. The system of any of the foregoing examples, further comprising an image sensor operably coupled to the computer-readable medium to provide the image.

9. The system of any of the foregoing examples wherein the computer-readable medium contains instructions that, when executed:
　determine a characteristic of a sloshing motion of the liquid in the rocket tank, based at least in part on the image; and
　based at least in part on the characteristic of the sloshing motion, direct operation of a forcing element that imparts a force on the rocket to at least partially counteract a force placed on the rocket by the sloshing motion of the liquid in the rocket tank.

10. A system for controlling a rocket in flight, comprising:
a computer-readable medium containing instructions that, when executed:
receive an image corresponding at least in part to a view of a liquid in a rocket tank;
based at least in part on the image, determine a characteristic of a sloshing motion of the liquid in the rocket tank; and
based at least in part on the characteristic of the sloshing motion, direct operation of a forcing element that imparts a force on the rocket to at least partially counteract a force placed on the rocket by the sloshing motion of the liquid in the rocket tank.

11. The system of example 10 wherein directing operation of a forcing element includes directing movement of a thrust vectoring engine carried by the rocket.

12. The system of any of the foregoing examples wherein directing operation of a forcing element includes directing a movement of an aerodynamic surface carried by the rocket.

13. The system of any of the foregoing examples wherein determining a characteristic of the sloshing motion includes determining a frequency of the sloshing motion.

14. The system of any of the foregoing examples wherein determining a characteristic of the sloshing motion includes determining an amplitude of the sloshing motion.

15. A rocket system, comprising:
a rocket tank;
an image sensor positioned to access an interior of the rocket tank and image an edge between the liquid and a wall of the rocket tank; and
a processor operatively coupled to the image sensor and containing machine-readable instructions that, when executed, estimate a level of the liquid in the rocket tank based on at least one of a size, shape, location, or orientation of the edge.

16. The system of example 15 wherein the image sensor is a visible spectrum image sensor.

17. The system of any of the foregoing examples wherein the instructions, when executed, identify the edge based at least in part on a detected difference in color between the liquid and the wall of the rocket tank.

18. The system of any of the foregoing examples wherein the instructions, when executed, estimate a volume of the liquid in the rocket tank, based at least in part on the level of the liquid in the rocket tank.

19. The system of any of the foregoing examples wherein the rocket tank is a propellant tank.

20. The system of any of the foregoing examples wherein the rocket tank is a propellant tank, and wherein the system further comprises a rocket engine coupled to the propellant tank, and wherein the instructions, when executed, change a thrust level of the rocket engine based at least in part on an input corresponding to the estimated level of the liquid in the rocket tank.

21. The system of example 20 wherein the instructions, when executed, shut down the rocket engine.

22. The system of any of the foregoing examples wherein the instructions, when executed:
determine a characteristic of a sloshing motion of the liquid in the rocket tank, based at least in part on the image; and
based at least in part on the characteristic of the sloshing motion, direct operation of a forcing element that imparts a force to the rocket to at least partially counteract a force placed on the rocket by the sloshing motion of the liquid in the rocket tank.

23. A rocket system, comprising:
a rocket tank;
an image sensor positioned to access an interior of the rocket tank and image an edge between the liquid and a wall of the rocket tank; and
a processor operatively coupled to the image sensor and programmed with instructions that, when executed:
determine a characteristic of a sloshing motion of the liquid in the rocket tank; and
based at least in part on the characteristic of the sloshing motion, direct operation of a forcing element that imparts a force to the rocket to at least partially counteract a force placed on the rocket by the sloshing motion of the liquid in the tank.

24. The system of example 23 wherein the rocket tank includes no baffles.

25. The system of any of the foregoing examples wherein the rocket tank includes a baffle, and wherein the instructions, when executed, at least partially counteract a greater portion of the force placed on the rocket by the sloshing motion that does the baffle.

26. The system of any of the foregoing examples wherein the rocket tank is a propellant tank.

27. The system of any of the foregoing examples, further comprising the forcing element, and wherein the forcing element includes an aerodynamic surface.

28. The system of any of the foregoing examples, further comprising the forcing element, and wherein the forcing element includes a thrust vectoring engine.

29. A system for detecting a liquid level in a rocket tank, comprising:
a computer-readable medium containing instructions that, when executed:
receive data corresponding at least to the liquid in the rocket tank;
based at least in part on the data, identify an edge between the liquid and a wall of the rocket tank; and
based on at least one of a size, shape, location, or orientation of the edge, estimate a level of the liquid in the rocket tank.

30. The system of example 29 wherein the data includes an image.

31. A system for controlling a rocket in flight, comprising:
a computer-readable medium containing instructions that, when executed:
receive data corresponding at least to the liquid in a rocket tank;
based at least in part on the data, determine a characteristic of a sloshing motion of the liquid in the rocket tank; and
based at least in part on the characteristic of the sloshing motion, direct operation of a forcing element that imparts a force on the rocket to at least partially counteract a force placed on the rocket by the sloshing motion of the liquid in the rocket tank.

32. The system of example 31 wherein the data includes an image.

We claim:
1. A system for detecting a level of a liquid in a rocket tank, comprising:
a computer-readable medium containing instructions that, when executed:
receive an image corresponding at least in part to a view of the liquid in the rocket tank;
identify an edge between the liquid and a wall of the rocket tank based at least in part on a detected difference in color between the liquid and the wall of the rocket tank in the image;

based on at least one of a size, shape, location, or orientation of the edge, estimate a characteristic of a sloshing motion of the liquid in the rocket tank; and based on the characteristic of the sloshing motion, causing a command to be sent to a rocket guidance system.

2. The system of claim 1, wherein the image is in a visible spectrum.

3. The system of claim 1, wherein the computer-readable medium contains instructions that, when executed, estimate a volume of the liquid in the rocket tank, based at least in part on the level of the liquid in the rocket tank.

4. The system of claim 1, wherein the liquid is a rocket propellant.

5. The system of claim 1, wherein the liquid includes rocket propellant, and wherein the computer-readable medium contains instructions that, when executed, change a thrust level of a rocket engine receiving the rocket propellant based at least in part on an input corresponding to the level of the liquid in the rocket tank.

6. The system of claim 5, wherein the instructions shut down the rocket engine.

7. The system of claim 1, further comprising an image sensor operably coupled to the computer-readable medium to provide the image.

8. The system of claim 1, wherein the computer-readable medium contains instructions that, when executed:

direct operation of a forcing element based in part on the command, the forcing element to impart a force on a rocket having the rocket tank to at least partially counteract a force placed on the rocket by the sloshing motion of the liquid in the rocket tank.

9. A system for controlling a rocket in flight, comprising:
a computer-readable medium containing instructions that, when executed:

receive an image corresponding at least in part to a view of a liquid in a rocket tank;

based at least in part on the image, determine a characteristic of a sloshing motion of the liquid in the rocket tank; and based at least in part on the characteristic of the sloshing motion, direct operation of a forcing element that imparts a force on the rocket to at least partially counteract a force placed on the rocket by the sloshing motion of the liquid in the rocket tank.

10. The system of claim 9, wherein directing operation of a forcing element includes directing movement of a thrust vectoring engine carried by the rocket.

11. The system of claim 9, wherein directing operation of a forcing element includes directing a movement of an aerodynamic surface carried by the rocket.

12. The system of claim 9, wherein determining a characteristic of the sloshing motion includes determining a frequency of the sloshing motion.

13. The system of claim 9, wherein determining a characteristic of the sloshing motion includes determining an amplitude of the sloshing motion.

14. A rocket system, comprising:
a rocket tank;
an image sensor positioned to access an interior of the rocket tank and image an edge between a liquid in the rocket tank and a wall of the rocket tank; and
a processor operatively coupled to the image sensor and containing machine-readable instructions that, when executed:

estimate a level of the liquid in the rocket tank based on at least one of a size, shape, location, or orientation of the edge;

determine a characteristic of a sloshing motion of the liquid in the rocket tank, based at least in part on the image; and based at least in part on the characteristic of the sloshing motion, direct operation of a forcing element that imparts a force to a rocket having the rocket tank to at least partially counteract a force placed on the rocket by the sloshing motion of the liquid in the rocket tank.

15. The rocket system of claim 14, wherein the image sensor is a visible spectrum image sensor.

16. The rocket system of claim 14, wherein the machine-readable instructions, when executed, identify the edge based at least in part on a detected difference in color between the liquid and the wall of the rocket tank.

17. The rocket system of claim 14, wherein the machine-readable instructions, when executed, estimate a volume of the liquid in the rocket tank, based at least in part on the level of the liquid in the rocket tank.

18. The rocket system of claim 14, wherein the rocket tank is a propellant tank.

19. The rocket system of claim 14, wherein the rocket tank is a propellant tank, and wherein the rocket system further comprises a rocket engine coupled to the propellant tank, and wherein the machine-readable instructions, when executed, change a thrust level of the rocket engine based at least in part on an input corresponding to the estimated level of the liquid in the rocket tank.

20. The rocket system of claim 19, wherein the machine-readable instructions shut down the rocket engine.

21. The rocket system of claim 14, wherein the characteristic includes an amplitude or frequency of waves of the liquid in the tank.

22. A rocket system, comprising:
a rocket tank;
an image sensor positioned to access an interior of the rocket tank and image an edge between a liquid in the rocket tank and a wall of the rocket tank; and
a processor operatively coupled to the image sensor and programmed with instructions that, when executed:

receive image data from the image sensor;

determine a characteristic of a sloshing motion of the liquid in the rocket tank based at least in part on the image data, wherein the characteristic includes an amplitude or a frequency of the sloshing motion; and based at least in part on the characteristic of the sloshing motion, direct operation of a forcing element that imparts a force to a rocket having the rocket tank to at least partially counteract a force placed on the rocket by the sloshing motion of the liquid in the rocket tank.

23. The rocket system of claim 22, wherein the rocket tank includes no baffles.

24. The rocket system of claim 22, wherein the rocket tank includes a baffle.

25. The rocket system of claim 22, wherein the rocket tank is a propellant tank.

26. The rocket system of claim 22, further comprising the forcing element, and wherein the forcing element includes an aerodynamic surface.

27. The rocket system of claim 22, further comprising the forcing element, and wherein the forcing element includes a thrust vectoring engine.

28. The system of claim 1, wherein the characteristic includes an amplitude or frequency of waves of the liquid in the tank.

\* \* \* \* \*